Figure 1:
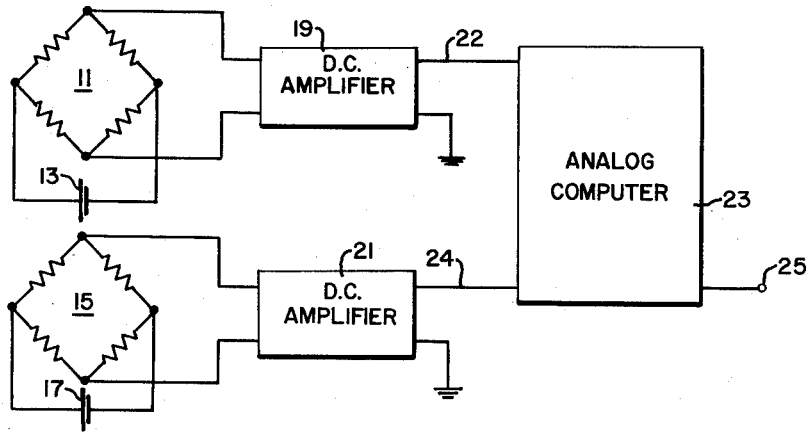

*INVENTOR.*
WOLFGANG A. MENZEL

United States Patent Office

3,095,735
Patented July 2, 1963

3,095,735
AERODYNAMIC COMPUTER AND METHOD
Wolfgang A. Menzel, Silver Spring, Md., assignor to the United States of America as represented by the Secretary of the Navy
Filed Apr. 14, 1960, Ser. No. 22,371
4 Claims. (Cl. 73—147)
(Granted under Title 35, U.S. Code (1952), sec. 266)

The invention described herein may be manufactured and used by or for the Government of the United States of America for governmental purposes without the payment of any royalties thereon or therefor.

This invention relates generally to analog computer circuits and more particularly to analog computer circuits utilized in strain gage balance systems.

Previously, in making wind tunnel tests, data from electrical strain gages were either fed into digital computers or otherwise computed to determine the coefficients of calibration equations necessary to the test. This meant that the results of the data were not available until after the test was completed. It was therefore impossible to know whether or not the test was being successfully carried out until the completion of the test. With the the use of the analog computer of this invention it is possible to set up a computer to fulfill the calibration equation without previous knowledge of strain gage characteristic constants.

It is an object of this invention to provide a computing device with which strain coefficients may be computed during tests.

Another object of this invention is to provide an analog computer circuit for wind tunnel strain gages.

Another object of this invention is to provide analog computing circuitry for electrical internal strain gages such that raw data may be converted into useful information during tests.

It is a further object of this invention to provide computing apparatus for determining coefficients of calibration equations for wind tunnel tests of models during said tests.

It is still another object of this invention to provide computing apparatus for determining coefficients of a calibration equation.

Figure 2:
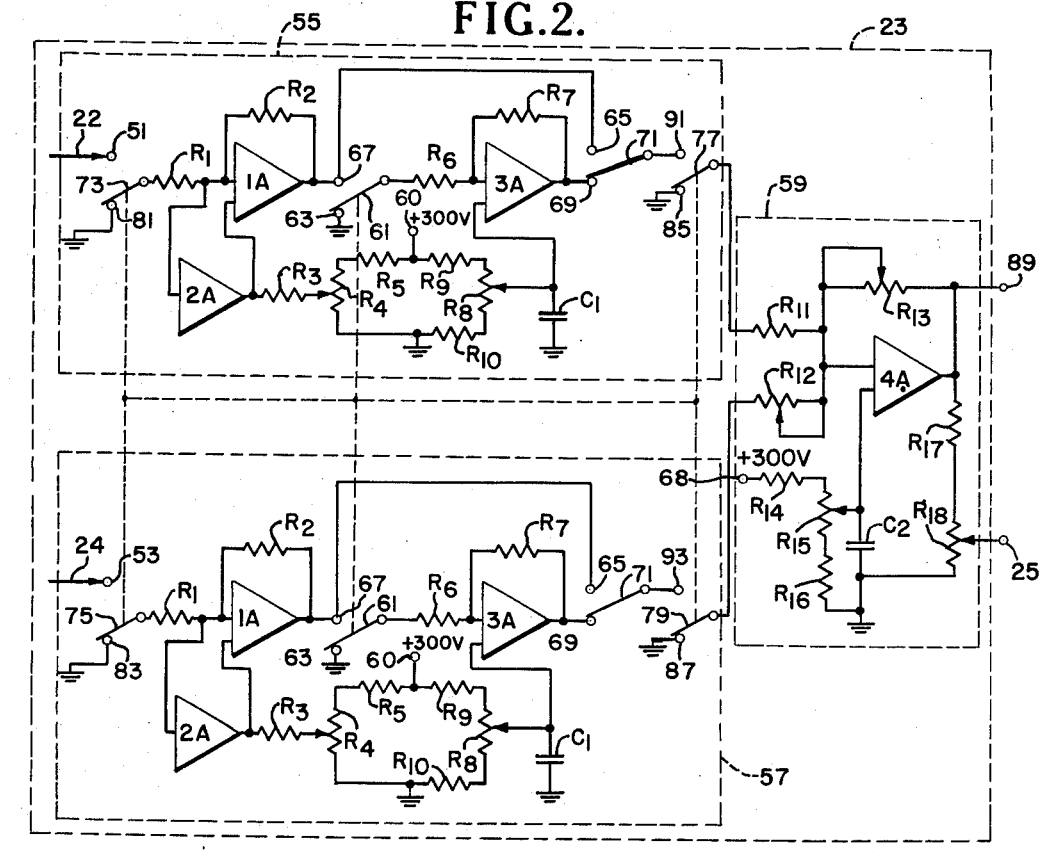

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 1 illustrates a block diagram of the computer circuit for one of the calibration equations as connected to a pair of strain gages; and FIG. 2 illustrates the computer circuit for computing the calibration coefficients of one of the calibration equations during wind tunnel tests.

Referring now to FIG. 1 of the drawings, illustrating a block diagram of the computer and strain gage arrangement, a first strain gage bridge 11 is energized by a D.C. source 13 and a second strain gage bridge 15 is energized by source 17. The outputs of strain gage bridges 11 and 15 are fed into D.C. amplifier circuits 19 and 21 respectively. The outputs of D.C. amplifiers 19 and 21 are fed into analog computer 23. The output from the analog computer is provided at terminal 25. The first strain gage resistance bridge 11 may represent for example the strain indication of a forward normal force strain gage section on a balance sting and the second strain gage resistance bridge 15 may represent the strain indication of a rear normal force strain gage section of the balance sting.

The resistance bridges 11 and 15 illustrated are electric resistance strain gages which may be made up of grids of resistance wire imbedded in thin sheets of Bakelite which may be cemented to structural members of a balance sting. When the structural member is placed under strain, the resistance grid distorts with the structural member and changes resistance in proportion to the elongation or contraction of the member. The strain gages may be, for example, that known in the art as Baldwin-Lima-Hamilton type SR-4, generally having a resistance of 120 ohms. Each of the load components for example, pitch, at each of the balance or strain gage locations is measured by four strain gages, wired in a Wheatstone bridge arrangement.

Referring now to FIG. 2 of the drawings in which detailed circuitry of analog computer 23 is illustrated, outputs from D.C. amplifiers 19 and 21 are fed into terminals 51 and 53 respectively from conductors 22 and 24. Analog computer 23 is comprised of two amplifiers 55 and 57 each having a stabilized operational amplifier circuit and a sign changing amplifier circuit, and computing amplifier 59. Amplifiers 55 and 57 have identical circuit components and connections, each comprises a high gain D.C. amplifier unit 1$a$ to provide the desired amplification of the input signals applied. In this type of amplifier circuit the amplification is proportional to the ratio of the input resistor $R_1$ and feedback resistor $R_2$. This is:

$$E_0 = \frac{R_2}{R_1} \times E_i$$

where $R_1$ is the input resistor and $R_2$ is the feedback resistor. In amplifier arrangements 55 and 57 the value of $R_1$ may be 100,000 ohms and the value of $R_2$ may be 1 megohm, providing an amplification factor of 10. A 300 volt D.C. source may be applied to terminal 60 to provide bias for the amplifier. Resistor $R_3$, variable resistor $R_4$ and resistor $R_5$, may have values of 1 megohm, 100,000 ohms and 200 megohms respectively. Resistor $R_3$ is connected between a variable tap of resistor $R_4$ and amplifier 2A. Resistors $R_4$ and $R_5$ are serially connected between terminal 60 and ground. Amplifier unit 2A is an A.C. amplifier unit having a chopper to provide a stabilizing A.C. voltage to amplifier 1A to prevent drift. The amplifier 1A, however, is operable without this additional amplifier circuit and, on the other hand, such a stabilizing amplifier may be added to the circuits of amplifiers 3A and 4A if improved performance is desired or needed. The output of amplifier 1A is fed into sign changing amplifier 3A or directly to the output of amplifier arrangement 55 or 57 depending upon the polarity of the output signal desired. The sign changing amplifier circuit includes a high gain amplifier unit 3A, which associated with input resistor $R_6$ and feedback resistor $R_7$ may each have a resistance value of 100,000 ohms and since they are of equal value, the gain of the sign changing amplifier is unity.

When switch 71 is connected to terminal 65, the output of amplifier 1A is applied directly to output terminal 91. With this setting of switch 71, the polarity of the output signal from amplifier 1A will be opposite to the polarity of the input signal $E_i$ applied to the input of amplifier 1A. With switch 71 connected to terminal 69 the signal from the output of amplifier 1A will be fed through sign changing amplifier 3A and the polarity of the output voltage appearing at terminal 91 will be same as the input voltage $E_i$ applied at terminal 22, for example. Bias is supplied to amplifier unit 3A from a 300 volt D.C. supply source through variable resistor $R_8$ of a voltage divider comprising resistors $R_8$, $R_9$, and $R_{10}$ serially connected between terminal 60 and ground. Resistor $R_8$ may have a resistance value of 2500 ohms, $R_9$ may have a resistance value of 2.2 megohms and resistor $R_{10}$ may have a resistance value of 8,000 ohms. A filtering capacitor $C_1$ connects between the top of variable resistor $R_8$ and ground to smoothen the bias voltage applied to amplifier unit 3A.

The computing amplifier portion 59 of analog computer comprises high gain amplifier unit 4A and resistors $R_{11}$, $R_{12}$ and $R_{13}$. Resistor $R_{11}$ may have a resistance value of 100,000 ohms, $R_{12}$ and $R_{13}$ are variable and each may have a resistance value of 300,000 ohms at maximum setting. In calculating the gain of computing amplifier 59, the following equation is employed:

$$e_0 = \frac{R_{13}}{R_{11}} e_1 - \frac{R_{13}}{R_{12}} e_2$$

where $e_0$ is the output voltage of the computing amplifier. Zero checks of the amplifier units 1A, 3A and 4A are made before the computer is placed in operation by means of grounding switches 61, 73, 75, 77 and 79 which may be mechanically ganged together as indicated. In making the zero check, switches 73, 75, 77 and 79 are connected to ground terminals 81, 83, 85 and 87 respectively and switches 61 are connected to ground terminals 63 of amplifier arrangements 55 and 57 respectively. The zero check for amplifier unit 1A is made by adjusting resistor $R_4$ until the output voltage at terminal 67 is zero. Similarly the zero check is made on amplifier unit 3A by adjusting variable resistor $R_8$ until the output voltage at terminal 69 is zero and the zero check on amplifier unit 4A is made by adjusting resistor $R_{15}$ until the output voltage at terminal 89 is zero. When the zero check is completed, the switches may be moved such that switches 61, 73, 75, 77 and 79 connect to terminals 63, 51, 53, 91 and 93 respectively. Switches 71 of amplifier arrangements 55 and 57 respectively may be left connected to the terminals 69 or moved to terminals 65 together or individually depending upon whether the sign changing amplifier unit is to be used or by-passed. It is possible to operate the amplifier with one switch 71 for example that of amplifier arrangement 55 connected to terminal 69 and the switch 71 of amplifier arrangement 57 connected to terminal 65.

Bias voltage is supplied to high gain amplifier unit 4A from a 300 volt D.C. source applied at terminal 68 across serially connected resistors $R_{14}$, $R_{15}$ and $R_{16}$. Resistor $R_{15}$ is variable and provided with a tap for connecting resistor $R_{15}$ to amplifier unit 4A. A capacitor $C_2$ having a capacitance of 0.1 microfarad connects between amplifier 4A and ground to provide a smoother action. Resistor $R_{14}$ has a value of 2.2 megohms, $R_{15}$ has a value of 2,500 ohms and $R_{16}$ has a value of 8000 ohms.

Referring now to FIGS. 1 and 2 for the operation of the computer with respect to the aerodynamic coefficients of the normal force, for example, voltages $H_1$ and $H_2$ developed in strain gage bridges 11 and 15 respectively provide the input voltages to D.C. amplifiers 19 and 21 and to analog computer 23. It should be understood that during a wind tunnel test, coefficients of other calibration equations, for example yaw, roll and axial thrust forces, may be made, each force of which requires a complete set of components connected as illustrated in FIGS. 1 and 2 of the drawings.

The calibration equation for a force such as normal force coefficients may be written as follows:

$$C_N = -A_N \frac{1}{q}(H_1 - H_1^0) + B_N \frac{1}{q}(H_2 - H_2^0)$$

where $C_N$ is the normal force coefficient $A_N$ and $B_N$ are constants involving the geometrical configuration of the model under test, $q$ is a factor dependent on the geometrical configuration of the model to be tested and the speed or mach number at which the model is to be tested and, $H_1$ and $H_2$ are voltages developed in the strain gages during the test of the forward and rear strain gage locations respectively and $H_1^0$ and $H_2^0$ are voltages of the strain gages before the test is begun. Voltages $H_1^0$ and $H_2^0$ may be made zero by proper initial balance adjustments. For computer operation purposes the coefficient equation may be rewritten as follows:

$$\frac{C_N}{A_N} = \left(-\frac{1}{q}H_1 + \frac{1}{q}\frac{B_N}{A_N}H_2\right)$$

If the strain gage output voltages are combined in their proper polarities with the proper weighting factors $$\left(1 \text{ and } \frac{B_N}{A_N}\right)$$

the resultant $C_N/A_N$ will be a constant, independent of the location of the load applied to the balance sting.

Comparing the calibration equation with the computer equation an identity is established if $H_1 - H_1^0 = e_1$, $H_2 - H_2^0 = e_2$;

$$A_N = \frac{R_0}{R_1}; \quad B_N = \frac{R_0}{R_2}$$

then $C_N = e_0$. In the computer amplifier circuit the values of voltage representing $H_1$ and $H_2$ are fed into resistors $R_{11}$ and $R_{12}$ respectively from the outputs of amplifier arrangements 55 and 57 respectively. With the calibration equation written as:

$$\frac{C_N}{A_N} = \left(\frac{1}{q}H_1 + \frac{-1}{q}\frac{B_N}{A_N}H_2\right)$$

it can be seen that if the factor $q$ is made unity and the term $$\frac{B_N}{A_N}$$

is applied to the voltage $H_2$, the value of $$\frac{C_N}{A_N}$$

may be determined. In operation, $$\frac{B_N}{A_N}$$

is fed into the computer in reciprocal form, that is $R_{12}$ is adjusted to a value representing $A_N/B_N$. With resistor $R_{11}$ representing a value of unity the quantity fed into the computing amplifier will be multiplied by $1/A_N/B_N$ or $$\frac{B_N}{A_N}$$

The proper value of $$\frac{B_N}{A_N}$$

is arrived at by adjusting resistor $R_{12}$ until the output of the computing amplifier, $C_N/A_N$, appearing at terminal 89 becomes constant when a given load is placed anywhere along the balance sting.

The factor $q$ may be introduced in the form of $1/q$ by adjusting the variable tap 13. This value may be introduced before the test if the value is known or during the test if the value is not known. A quality representation of $C_N$ may be obtained from terminal 25. The output from terminal 25 is then fed to a recording device, such as an ink recorder. When the values of $A_N/B_N$ and $$\frac{1}{q}$$

for example are fed into resistors $R_{12}$ and $R_{13}$ respectively, the apparatus has been calibrated for the normal force equation and the wind tunnel tests may begin, with the output values of terminal 25 recorded continuously during the test. It should be understood of course that the same calibration procedure must be used for each of the additional forces for example roll, yaw or axial thrust force, and that a separate computer arrangement as illustrated in FIG. 1 of the drawings is needed for each of these forces from which calibration constants are desired.

With the use of the apparatus of this invention, individual tolerances in resistance values and variations in the gains of amplifiers 19 and 21, for example, are not critical as compensations may be made in the setting of the computer. Non-linearity of the variable resistor such as $R_{12}$ is also compensated for inasmuch as the actual resistance values are not set by turning the resistor tap to a particular scale setting, but rather it is adjusted until the proper output value occurs at the output of the computer.

Another advantage of using the computer set up of this invention is that the value $B_N/A_N$ is determined by adjusting one resistor, namely $R_{13}$, rather than attempting to introduce $A_N$ and $B_N$ separately by adjusting two separate resistors.

Obviously many modifications and variations of the present invention are possible in the light of the above teachings. It is therefore to be understood, that within the scope of the appended claims, the invention may be practiced otherwise than as specifically described.

What is claimed as new and desired to be secured by Letters Patent of the United States is:

1. Analog calibration apparatus for determining a calibration constant of a calibration equation having first, second and third coefficients for wind tunnel test data comprising first and second electrical strain gages providing first and second signal voltages, each of said voltage being indicative of the strain of a structural member, first and second amplifier means connected to the output of said first and second strain gages respectively to amplify said signal voltages, analog computer means comprising a first operational amplifier circuit, said first operational amplifier circuit connected to the output of said first amplifier means to amplify said first signal voltage, a second operational amplifier circuit connected to the output of said second amplifier means to amplify said second signal voltage, a third operational amplifier circuit, means applying the output of said first operational amplifier to the input of said third amplifier, means applying the output of said second operational amplifier to the input of said third amplifier, single adjustable means applying a ratio of a first and second coefficient to the output of said second operational amplifier whereby an output from said third operational amplifier is produced which is proportional to said third coefficient which is indicative of said calibration constant.

2. Analog computer apparatus for determining a term of a calibration equation, said equation having first and second coefficients for wind tunnel test data, comprising a first electrical strain gage adapted to be mounted on a first structural member, a second electrical strain gage adapted to be mounted on a second structural member said first electrical strain gage operative to provide a voltage output indicative of the strain of said forward structural member, said second electrical strain gage operative to provide a second voltage output indicative of the strain of said second structural section, analog computer means comprising a first operational amplifier arrangement having an input and an output, a second operational amplifier arrangement having an input and an output, means applying a voltage proportional to said first strain gage output to the input of said first operational amplifier arrangement, means applying a voltage proportional to said second strain gage output to the input of said second operational amplifier arrangement, an operational computer amplifier having a first input, a second input, and an output, means connecting the output of said first operational amplifier arrangement whereby a voltage proportional to said first strain gage output may be applied thereto, means connecting the output of said second operational amplifier arrangement to the second input of said operational computer amplifier whereby a voltage proportional to said second strain gage output may be applied thereto, single adjustable means applying a ratio of said first and second coefficients of said calibration equation to said second input of said operational computer amplifier whereby an output proportional to said calibration constant of said calibration equation is produced.

3. An analog computer for determining a calibration constant of a calibration equation having first and second coefficients for wind tunnel test data comprising a first electrical strain gage adapted to be mounted on a first structural section, a second electrical strain gage adapted to be mounted on a second structural section, said first electrical strain gage operative to provide a voltage output indicative of the strain of said forward structural member, said second electrical strain gage operative to provide a second voltage output indicative of the strain of said second structural section, a first D.C. amplifier having an input and an output, a second D.C. amplifier having an input and an output, the input of the said first D.C. amplifier being connected to said first strain gage, the input of said second D.C. amplifier being connected to said second strain gage, a first amplifier arrangement having an input and an output and including a first operational amplifier having an input and an output and a first polarity-reversing operational amplifier having an input and an output, a second amplifier arrangement having an input and an output and including a second operational amplifier having an input and an output, and a second polarity-reversing operational amplifier having an input and an output, said first and second operational amplifiers having equal gains greater than unity, said first and second polarity-reversing operational amplifiers each having gains of unity and operable to reverse the polarity of signal applied thereto, means connecting the output of said first D.C. amplifier to the input of said first operational amplifier, means connecting the output of said second D.C. amplifier to the input of said second operational amplifier, means including a first switching means for selectively connecting the output of said first operational amplifier to the input of said first polarity-reversible operational amplifier or to the output of said first amplifier arrangement as desired, means including a second switching means for selectively connecting the output of said second operational amplifier to the input of said second polarity-reversible operational amplifier or to the output of said second amplifier arrangement as desired, an operational computer amplifier comprising a first resistor having an input terminal and an output terminal, a second resistor having an input terminal, an output terminal and a single adjusting means, a high gain amplifier unit having an input and an output, a feedback resistor having first terminal and a second terminal, said second resistor and said feedback resistor being adjustable, means connecting the output of said first amplifier arrangement to the input terminal of said first resistor, means connecting the output of said second amplifier arrangement to the input terminal of said second resistor, means connecting the output terminals of said first and second resistors to the input of said high gain amplifier unit, means connecting the input of said high gain amplifier unit to said first terminal of said feedback resistor, means connecting the output of said high gain amplifier to the second terminal of said feedback resistor, whereby a voltage proportional to said first strain gage output may be applied to said first resistor and a voltage proportional to said second strain gage output may be applied to said second resistor and whereby said second resistor may be adjusted to a value representing a ratio of said first and second coefficient to produce an output from said high gain amplifier unit which is proportional to said constant of said calibration equation.

4. A method of calibrating wind tunnel test equipment, comprising the steps of placing a weight at several positions along a balance sting in succession, applying a first output voltage from an electrical strain gage located in the forward part of said balance sting to a first input resistor of a computer amplifier, applying a second voltage output from an electrical strain gage located in the rearward part of said balance sting to a second input resistor of said computer amplifier, adjusting said second resistor until the output of said computer amplifier remains constant when said weight is placed at any position along the length of said balance sting.

References Cited in the file of this patent

UNITED STATES PATENTS

| | | |
|---|---|---|
| 2,731,198 | Hathaway | Jan. 17, 1956 |
| 2,782,636 | Peucker | Feb. 26, 1957 |
| 2,855,779 | Zaid | Oct. 14, 1958 |

OTHER REFERENCES

Johnson: "Analog Computer Techniques," published by McGraw-Hill, New York, 1956.

Currie: "The General Purpose Analog Computer," Military Electronics, March 1951.